(12) United States Patent
Ahmad

(10) Patent No.: US 12,349,172 B2
(45) Date of Patent: Jul. 1, 2025

(54) ADAPTIVE OUT-OF-BAND INTERFERENCE AVOIDANCE

(71) Applicant: FORD GLOBAL TECHNOLOGIES, LLC, Dearborn, MI (US)

(72) Inventor: Syed Amaar Ahmad, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 407 days.

(21) Appl. No.: 17/930,647

(22) Filed: Sep. 8, 2022

(65) Prior Publication Data

US 2024/0090004 A1    Mar. 14, 2024

(51) Int. Cl.
H04W 72/52   (2023.01)
H04L 5/00    (2006.01)
H04W 24/08   (2009.01)
H04W 84/12   (2009.01)

(52) U.S. Cl.
CPC ........... *H04W 72/52* (2023.01); *H04L 5/0058* (2013.01); *H04L 5/006* (2013.01); *H04W 24/08* (2013.01); *H04W 84/12* (2013.01)

(58) Field of Classification Search
CPC ..... H04W 72/52; H04W 24/08; H04W 84/12; H04W 72/54; H04L 5/0058; H04L 5/006
See application file for complete search history.

(56) References Cited

U.S. PATENT DOCUMENTS

| | | | |
|---|---|---|---|
| 6,081,566 A | 6/2000 | Molnar et al. | |
| 8,761,228 B2 | 6/2014 | Smadi | |
| 8,805,285 B2 | 8/2014 | Thota et al. | |
| 8,874,034 B2 | 10/2014 | Walley et al. | |
| 9,565,705 B2 | 2/2017 | Noh et al. | |
| 10,660,126 B2 | 5/2020 | Yoshimoto et al. | |
| 10,917,891 B2 | 2/2021 | Kim | |
| 2008/0136704 A1* | 6/2008 | Chan | G01S 7/282 342/201 |
| 2022/0210829 A1* | 6/2022 | Kim | H04W 4/40 |

FOREIGN PATENT DOCUMENTS

CN        112105030 A      12/2020

* cited by examiner

*Primary Examiner* — Kwang B Yao
*Assistant Examiner* — Patrick Yipao Pei
(74) *Attorney, Agent, or Firm* — Joseph Zane; Brooks Kushman P.C.

(57) ABSTRACT

Scheduling communications using a plurality of wireless interfaces is provided. Signals received from an antenna are monitored to detect a level of congestion over a message protocol. Responsive to the level of congestion exceeding a first threshold, a transmission mode is transitioned to a first mode which allows use of first and second subchannels for sending messages. Responsive to the level of congestion being below a second threshold, the second threshold being indicative of a lower level of congestion caused by message protocol traffic over the plurality of subchannels than the first threshold, the transmission mode is transitioned to a second mode which allows use of the first subchannels but not the second subchannels for sending the messages. One or more subchannels over which to send a first message of the messages are chosen in accordance with the transmission mode. The first message is sent using the antenna.

18 Claims, 8 Drawing Sheets

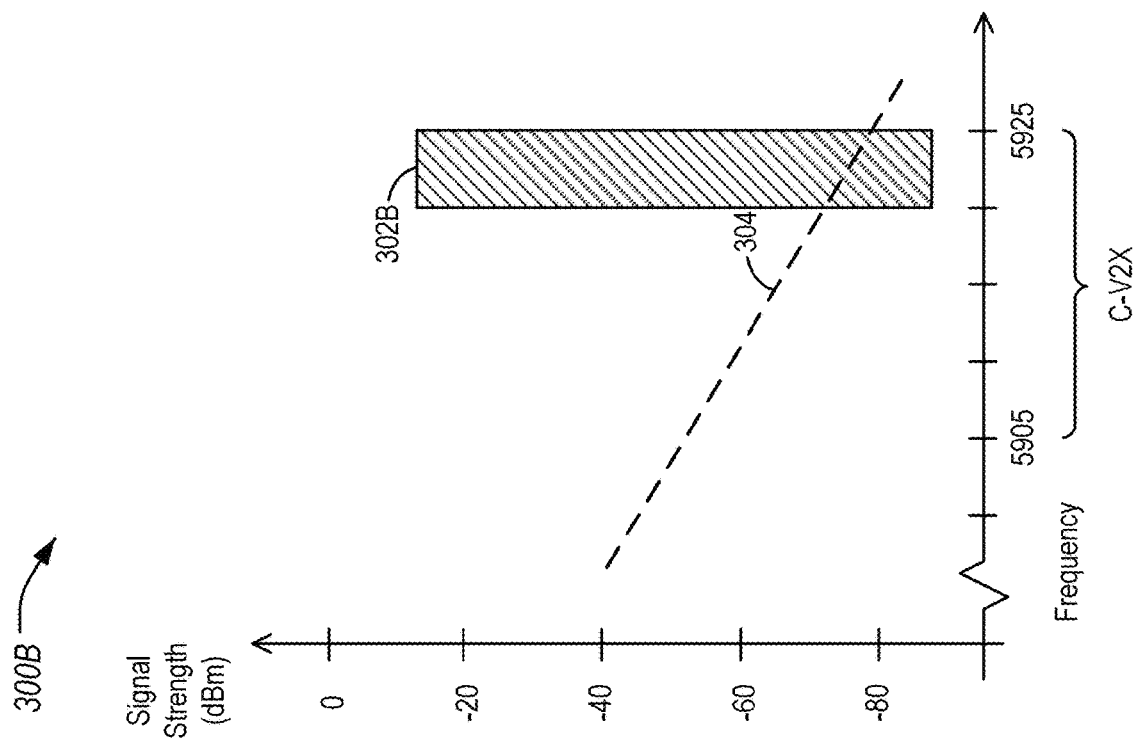
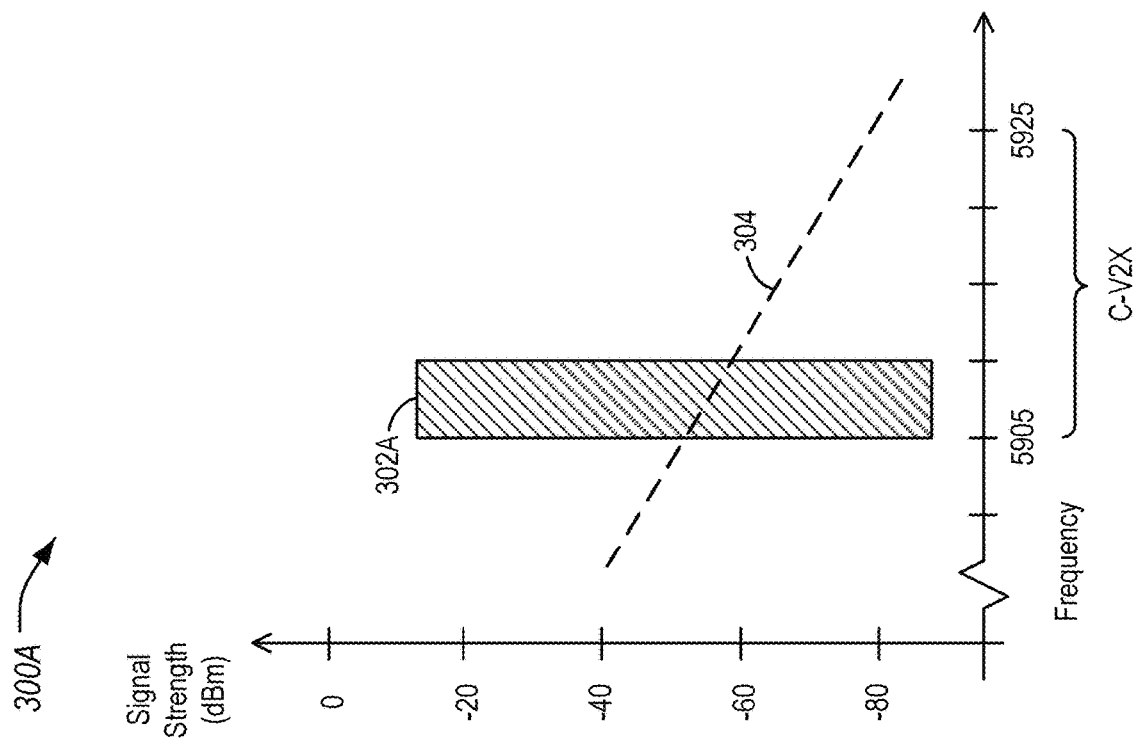

ADAPTIVE OUT-OF-BAND INTERFERENCE AVOIDANCE

TECHNICAL FIELD

Aspects of the disclosure generally relate to adaptive out-of-band interference avoidance.

BACKGROUND

Vehicles may broadcast BSMs according to the 3rd Generation Partnership Project (3GPP) release 14/15 cellular vehicle-to-everything (C-V2X) standard. This is sometimes referred to as the long-term evolution (LTE) vehicle-to-everything (V2X). These messages may be broadcast in the frequency range of 5905-5925 MHz, and may be used for applications such as object avoidance. The Unlicensed National Information Infrastructure (U-NII) radio band 4 (U-NII-4) is part of the radio frequency spectrum used by wireless local area network (WLAN) devices. Messages may be broadcast over this protocol in the frequency range of 5850-5895 MHz.

SUMMARY

In one or more illustrative examples, a system for scheduling communications using a plurality of wireless interfaces is provided. An antenna is configured to send and/or receive data over a message protocol having a plurality of subchannels, the plurality of subchannels including first subchannels relatively less susceptible to out-of-band interference and second subchannels relatively more susceptible to the out-of-band interference. A controller is configured to utilize a scheduler to perform operations including to monitor signals received from the antenna to detect a level of congestion over the message protocol, responsive to the level of congestion exceeding a first threshold, transition a transmission mode of the controller to a first mode which allows use of the first and second subchannels for sending messages, responsive to the level of congestion being below a second threshold, the second threshold being indicative of a lower level of congestion caused by message protocol traffic over the plurality of subchannels than the first threshold, transition the transmission mode of the controller to a second mode which allows use of the first subchannels but not the second subchannels for sending the messages, choose one or more subchannels over which to send a first message of the messages in accordance with the transmission mode, and send the first message using the controller.

In one or more illustrative examples, a method for scheduling communications using a plurality of wireless interfaces is provided. Signals received from an antenna are monitored to detect a level of congestion over a message protocol. Responsive to the level of congestion exceeding a first threshold, a transmission mode is transitioned to a first mode which allows use of first and second subchannels for sending messages. Responsive to the level of congestion being below a second threshold, the second threshold being indicative of a lower level of congestion caused by message protocol traffic over the plurality of subchannels than the first threshold, the transmission mode is transitioned to a second mode which allows use of the first subchannels but not the second subchannels for sending the messages. One or more subchannels over which to send a first message of the messages are chosen in accordance with the transmission mode. The first message is sent using the antenna.

In one or more illustrate examples, a non-transitory computer-readable medium includes instructions for scheduling communications using a plurality of wireless interfaces that, when executed by a processor of a controller, cause the controller to perform operations including to monitor signals received from an antenna to detect a level of congestion over a message protocol; responsive to the level of congestion exceeding a first threshold, transition a transmission mode to a first mode which allows use of first and second subchannels for sending messages; responsive to the level of congestion being below a second threshold, the second threshold being indicative of a lower level of congestion caused by message protocol traffic over the subchannels than the first threshold, transition the transmission mode to a second mode which allows use of the first subchannels but not the second subchannels for sending the messages; choose one or more subchannels over which to send a first message of the messages in accordance with the transmission mode; and send the first message using the antenna.

BRIEF DESCRIPTION OF THE DRAWINGS

FIG. 3A illustrates an example of a BSM being transmitted in a lower subchannel in the context of interference from the U-NII-4 device;

FIG. 3B illustrates an example of a BSM being transmitted in a higher subchannel in the context of the interference from the U-NII-4 device;

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present approach.

C-V2X technology has become increasingly popular in the automobile industry. V2X operations can provide valuable real-time traffic information, mapping, traffic light signaling, and tolling services as part of an intelligent transportation system (ITS). However, the operation of Wi-Fi or other unlicensed devices in neighboring frequency bands near a V2X device may disrupt and deteriorate the Quality-of-Service (QoS) because of out-of-band emissions (OOBE) causing harmful interference. OOBE from a U-NII-4 device (e.g., operating in the frequency range of 5850-5895 MHz) may cast interference in the ITS band (e.g., operating in the frequency range of 5905-5925 MHz). Thus, C-V2X messaging may be vulnerable to U-NII-4 interference, especially at lower end of the ITS band.

Aspects of the disclose provide an approach to avoid OOBE interference. The approach may include avoidance of subchannels most likely to experience interference during low congestion conditions and switching to use of all subchannels if congestion is detected. Notably, the avoidance of certain subchannels may be performed regardless of whether interference is actually detected. Moreover, in certain conditions the hybrid automatic repeat request (HARQ) retransmission may optionally be adjusted to occur in the middle of the ITS band so that there is a better chance of reception. By adopting such an approach, C-V2X may become resilient and robust against harmful interference. Reliable communication range for V2X applications may be significantly increased through this approach.

Figure 1:
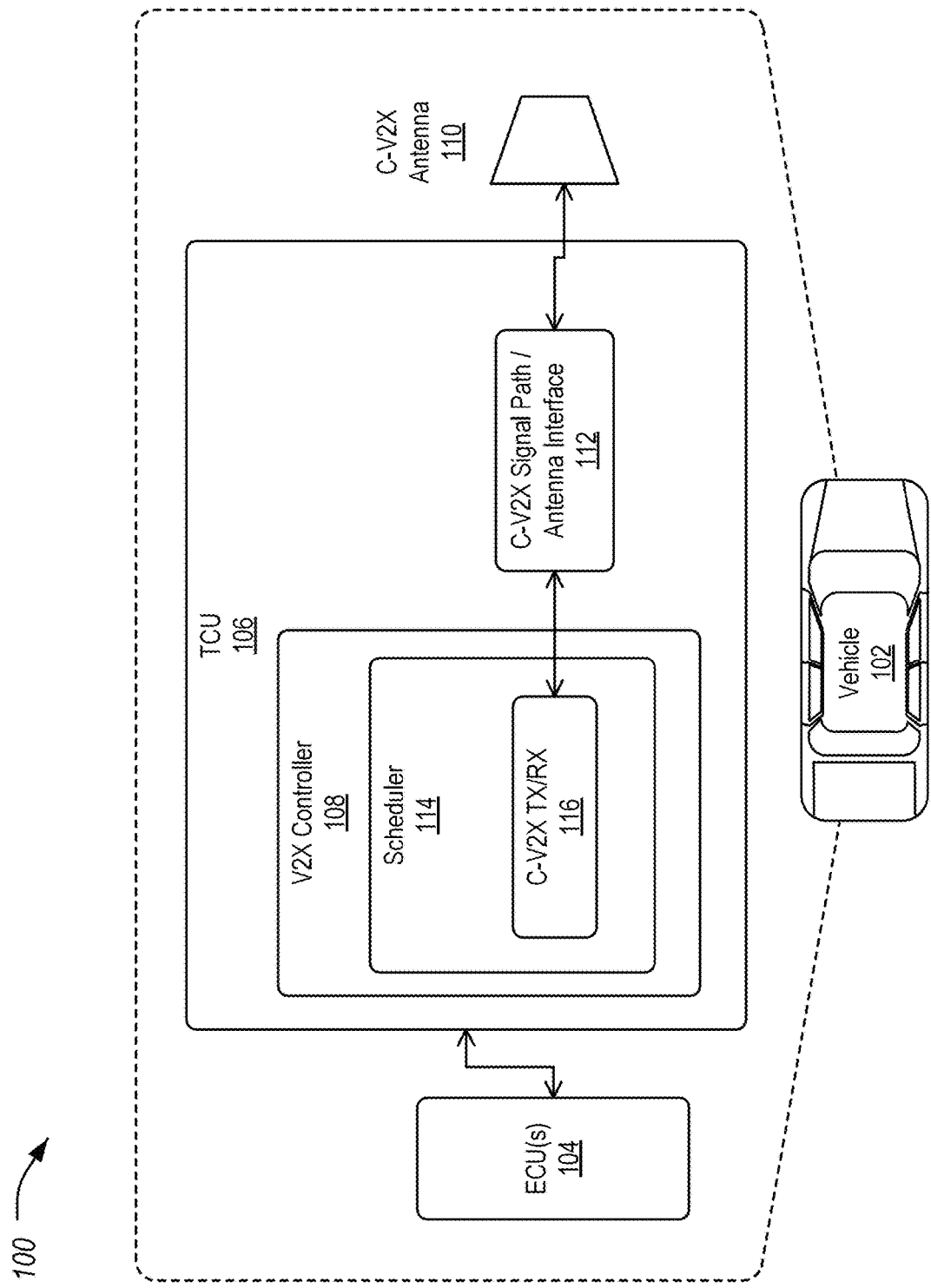
FIG. 1 illustrates an example system for scheduling vehicle communications using a plurality of wireless interfaces.

FIG. 1 illustrates an example system 100 for a vehicle 102 configured to avoid OOBE interference for C-V2X. A telematics control unit (TCU) 106 may be connected to one or more electronic control units (ECUs) 104, e.g., over one or more vehicle buses. The TCU 106 may include a V2X module 108 that hosts a scheduler 114 for C-V2X communications. The scheduler 114 may utilize a C-V2X TX/RX monitor 116 to monitor a C-V2X antenna 110. Based on the monitoring, the scheduler 114 may be configured to schedule vehicle 102 C-V2X communications to avoid OOBE interference. While an example system 100 is shown in FIG. 1, the example components as illustrated are not intended to be limiting.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors only.

The plurality of ECUs 104 may be configured to perform and manage various vehicle 102 functions under the power of the vehicle battery and/or drivetrain. As some non-limiting vehicle ECUs 104 examples: a powertrain control module (PCM) may be configured to control engine and transmission components; an antilock brake system (ABS) controller configured to control brake and traction control components; an electric power-assisted steering (EPAS) controller configured to control steering assistance and adjust pull or drift compensation functions; advanced driver assistance systems (ADAS) such as adaptive cruise control or automate braking; and a headlamp control module (HCM) configured to control light on/off settings. The ECUs 104 may also include other powertrain or chassis components, an infotainment system configured to support voice command and BLUETOOTH interfaces with the driver and driver carry-on devices, electromechanical body controllers such as window or lock actuators, and trailer controller components such as light control and sensor data to support connected trailers. The plurality of ECUs 104 may share physical hardware, firmware, and/or software, such that the functionality from multiple ECUs 104 may be integrated into a single ECU 104 or distributed across a plurality of ECUs 104.

The TCU 106 may be configured to support communications between the vehicle 102 and other devices. These communications may be performed over various communications protocols and for various purposes. In one example the TCU 106 may support V2X communications via the V2X module 108. The illustrated configuration is a single antenna configuration, having a C-V2X antenna 110 connected to the V2X module 108 via a C-V2X signal path and antenna interface 112. It should be noted that this is only an example, and TCUs 106 configured with more, fewer, and different protocols of communications interfaces and antennas are possible. In another example, the vehicle 102 may include multiple antennas, such as a Wi-Fi antenna configured to send and receive Wi-Fi transmissions.

The V2X module 108 may include the scheduler 114 as mentioned above. The scheduler 114 may be configured to schedule communications via the C-V2X antenna 110. To do so, the scheduler 114 may include a C-V2X transmit (TX)/receive (RX) monitor 116. The C-V2X TX/RX monitor 116 may be configured to monitor the transmission and reception of messages via the C-V2X antenna 110. Using the C-V2X TX/RX monitor 116, the scheduler 114 may be made aware of history of all received and transmitted BSMs and also may be aware of their time slots (e.g., of 1 ms) and their subchannels over C-V2X. Additionally, the scheduler 114 may be made aware of interference that may be detected over the C-V2X antenna 110, e.g., signal that could not be decoded into a valid BSM.

Figure 2:
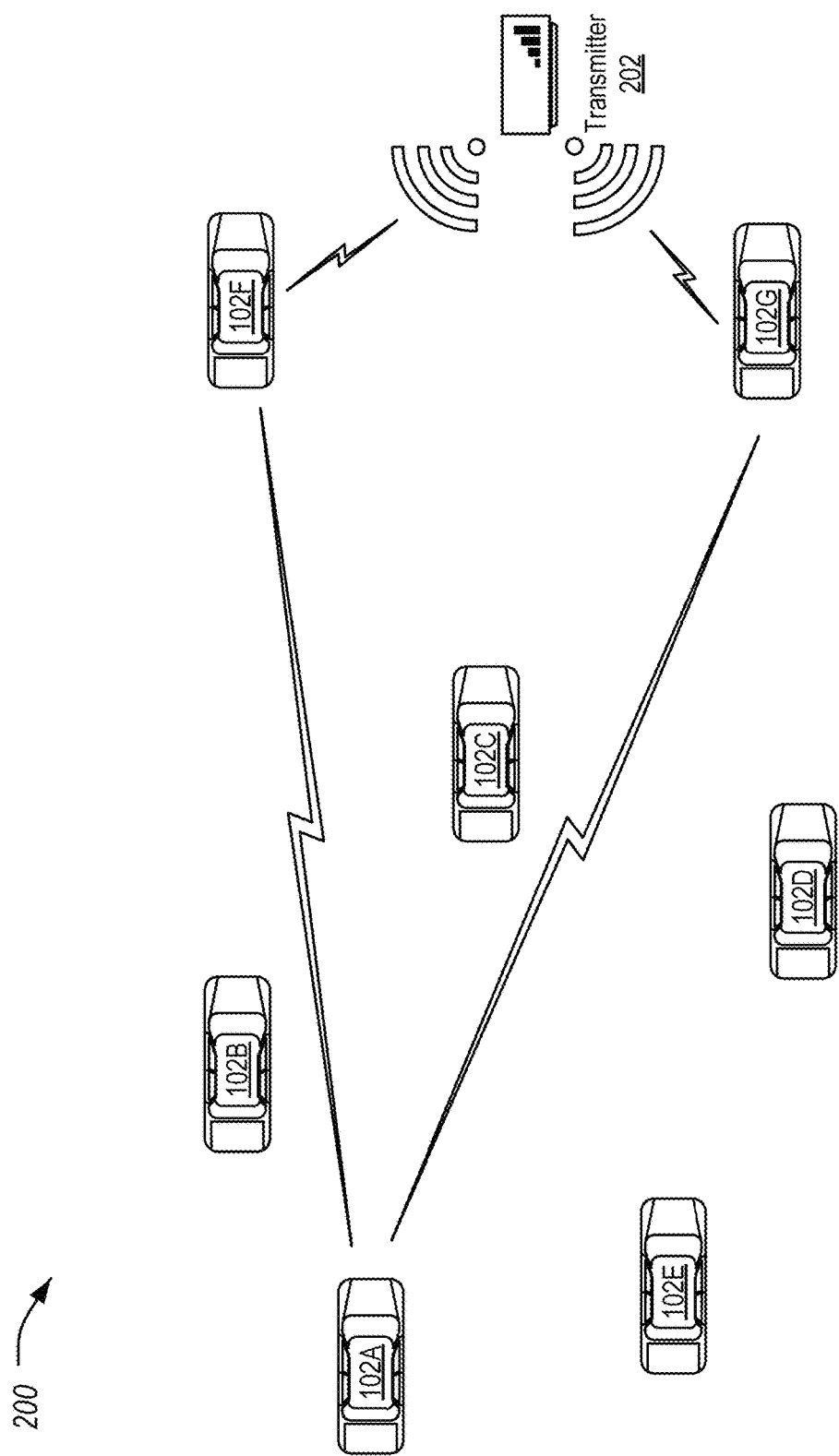
FIG. 2 illustrates an example of a plurality of vehicles and a U-NII-4 device producing interference.

FIG. 2 illustrates an example 200 of a plurality of vehicles 102 and a U-NII-4 device 202 producing interference. As shown, the plurality of vehicles 102 includes seven vehicles 102A-102G distributed across an area. The vehicles 102A-G may transmit and receive BSMs every 100 milliseconds (in an example). Each BSM may be transmitted by the respective vehicle 102A-G twice for higher reliability (a first transmission followed by a hybrid-ARQ retransmission).

In the example 200, the U-NII-4 device 202 is located closer to vehicles 102F-102G than to the vehicle 102A-E. Due to their closer proximity to the U-NII-4 device 202, the vehicles 102F-G may suffer interference because of U-NII-4 transmissions emanating from the U-NII-4 device 202. This OOBE from the U-NII-4 device 202 may cause harmful interference to the vehicles 102F-102G. As the vehicles 102A-102E are further from the U-NII-4 device 202, the OOBE from the U-NII-4 device 202 may be less severe for the other vehicles 102A-102E. In fact, the vehicles 102A-E may be unaware of the interference from the U-NII-4 device 202.

The OOBE may also be stronger for C-V2X near the band edge between ITS band and U-NII-4 band. Thus, if the vehicles 102A-E use the lower subchannels near 5905 MHz, it may be more difficult for the vehicles 102F-G to hear these messages due to higher OOBE harmful interference. As the vehicles 102A-E may be unaware of the interference from the U-NII-4 device 202, the vehicles 102A-E may not have a reason to prefer the higher C-V2X subchannels. Yet, if a BSM 302 is transmitted in the band that experiences least OOBE emissions (e.g., BSM 302B as opposed to BSM 302A), then the harmful effect of the interference may be minimized.

FIG. 3A illustrates an example 300A of a BSM 302A being transmitted in a lower subchannel in the context of interference 304 from the U-NII-4 device 202. FIG. 3B illustrates an example 300B of a BSM 302B being transmitted in a higher subchannel in the context of the interference 304 from the U-NII-4 device 202. The X-Axis of the examples 300A and 300B represents frequency, while the Y-Axis represents signal strength. The 20 MHz ITS band 5905-5925 MHz may be divided into ten contiguous subchannels, each of 0.18 MHz (e.g., 18 MHz within the 20 MHz). Typically, a C-V2X transmission of a BSM 302 requires two contiguous subchannels, which may be over any of the two subchannels. As shown, the BSM 302A may be occupy subchannels 0-1, while the BSM 302B may occupy subchannels 8-9. The interference 304 is shown with a typical power spectral density across the ITS band. As can be seen, the U-NII-4 interference 304 emission power is much lower towards the right-side of the ITS band.

Figure 4:
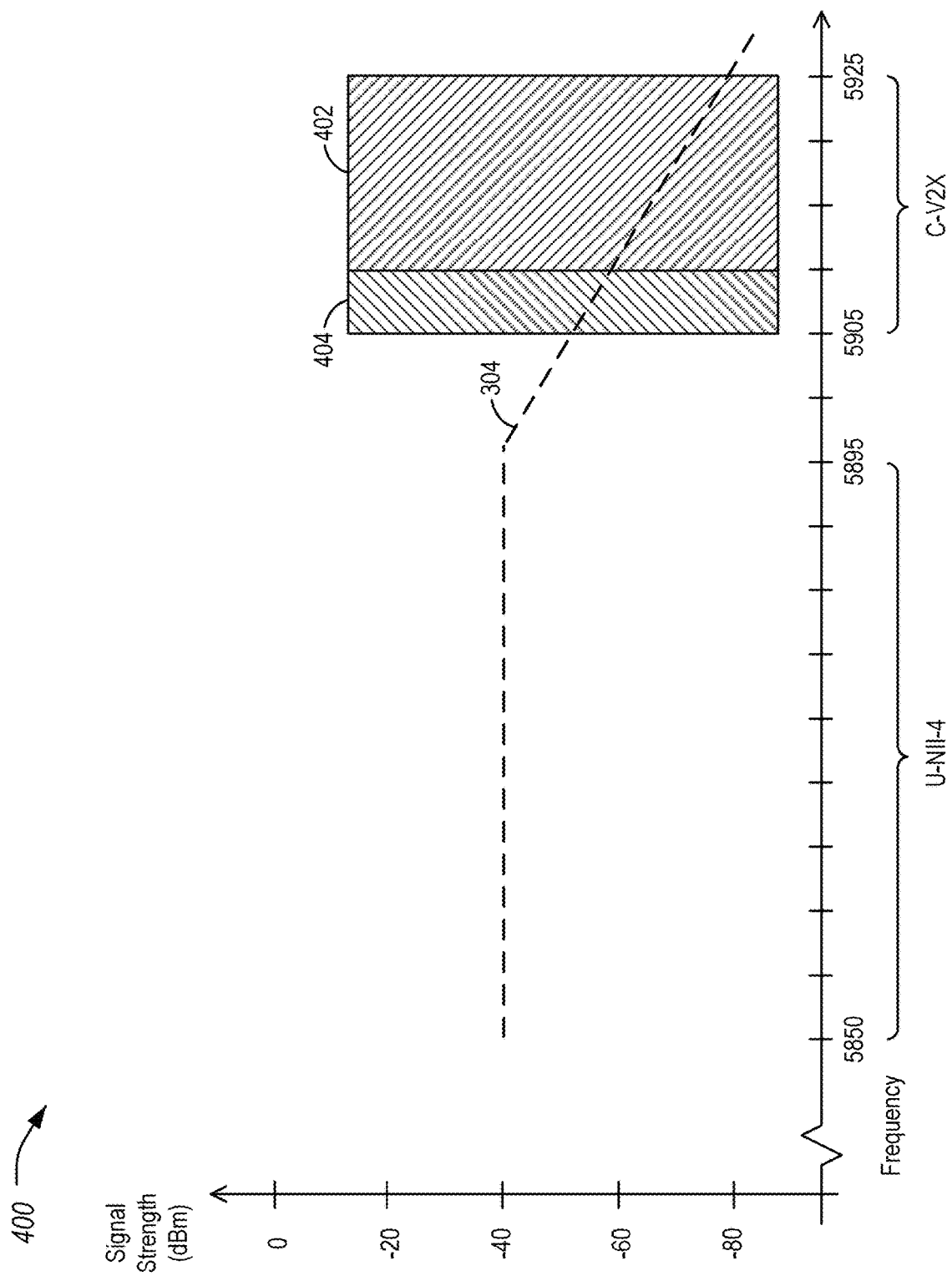
FIG. 4 illustrates an example illustrating a first portion of subchannels for BSM communication in lower congestion situations, and a second portion of subchannels for BSM communication in higher congestion situations.

FIG. 4 illustrates an example 400 illustrating a first portion of subchannels 402 for BSM 302 communication in lower congestion situations, and a second portion of subchannels 404 for BSM 302 communication in higher congestion situations. The example 400 also illustrates the interference 304 for reference. As with FIGS. 3A-3B, the X-Axis of the example 400 represents frequency, while the Y-Axis represents signal strength.

Because of the interference 304 gradient over the ITS frequencies, a vehicle 102 may default to avoiding use of the subchannels 402 closest to band edges. In other words, to avoid the channels that are most likely to experience interference 304, initially all vehicles 102 may cooperatively use the higher subchannels 402 and avoid the lowest subchannels 404. In this example, the vehicles 102 may collaboratively avoid the lowest N (e.g., N=2) subchannels 404. However, in other example, a different quantity of lowest subchannels 404 may be avoided in the initial state.

If all vehicles 102 follow this approach, the vehicles 102 may ensure that they all receive less harmful interference 304 from any nearby interferer. By collaboratively avoiding subchannels 404 near band edges of unlicensed emitters, all vehicles 102 may benefit by avoiding OOBE interference 304. Significantly, this approach may be performed by the vehicles 102 regardless of whether OOBE is detected. This accordingly provides a collective benefit in the example 200 shown in FIG. 2, as the vehicles 102F-G may be able to receive BSMs 302 from even the most distant vehicle 102A.

However, responsive to a vehicle 102 detecting a high number of other vehicles 102 (e.g., a high congestion load) the vehicle 102 may begin to use the lower subchannels 404. Thus, responsive to the C-V2X channel congestion from BSMs 302 or other C-V2X messages becoming too large, the vehicles 102 may avail of the entire band (e.g., all 10 subchannels 402, 404) to choose subchannels 402, 404 for transmissions (and thus accept the potential for suffering interference 304). Responsive to the C-V2X congestion load dropping, the vehicles 102 may dynamically and opportunistically revert back to excluding the lowest subchannels 404 to avoid the interference 304.

In one specific example, a vehicle 102 detecting OOBE harmful interference 304 may indicate so in its transmitted BSMs 302. This may be accomplished, in an example, through including this information into a special embedded field of the BSM 302. When set, this field may indicate to neighboring vehicles 102 that (a) the sending vehicle 102 is experiencing interference 304 and/or (b) the nearby vehicles 102 should transmit on higher subchannels 402 indices (e.g., away from the lower band edge). Providing this information from the vehicle 102 experiencing the interference 304 to the other vehicles 102 may be useful in congested C-V2X situations, where a few close-by vehicles 102 help avoid the interference 304 for this requesting vehicle 102 but other vehicles 102 farther away may continue using all the subchannels 402, 404.

For instance, any vehicles 102 may avail any of the subchannels 404 in addition to the subchannels 402 to transmit BSMs 302 responsive to the C-V2X congestion exceeding the threshold of BSMs 302 received per time (e.g., $M_1$=500 BSMs/sec). Those vehicles 102 may also revert to excluding the subchannels 404 in resource scheduling responsive to the received BSMs 302 per time dropping below a second threshold (e.g., $M_2$=450 BSMs/sec). This gap between $M_1$ and $M_2$ may be used to provide hysteresis and to ensure stability of the approach.

In some examples, under congestion load, when a vehicle 102 transmits on the most vulnerable OOBE interference-prone subchannels 404, the vehicle 102 may alternate its HARQ retransmission to occur in the middle of the ITS band so that there is still a better chance of other vehicles 102 receive at least one transmission with minimum interference 304.

It should be noted that it is not necessary for a vehicle 102 to detect OOBE interference 304 to benefit from above approach. When all vehicles 102 transmit using the approach described herein, those vehicles 102 that are actually suffering OOBE interference 304 will have a higher chance of receiving C-V2X packets.

Figure 5:
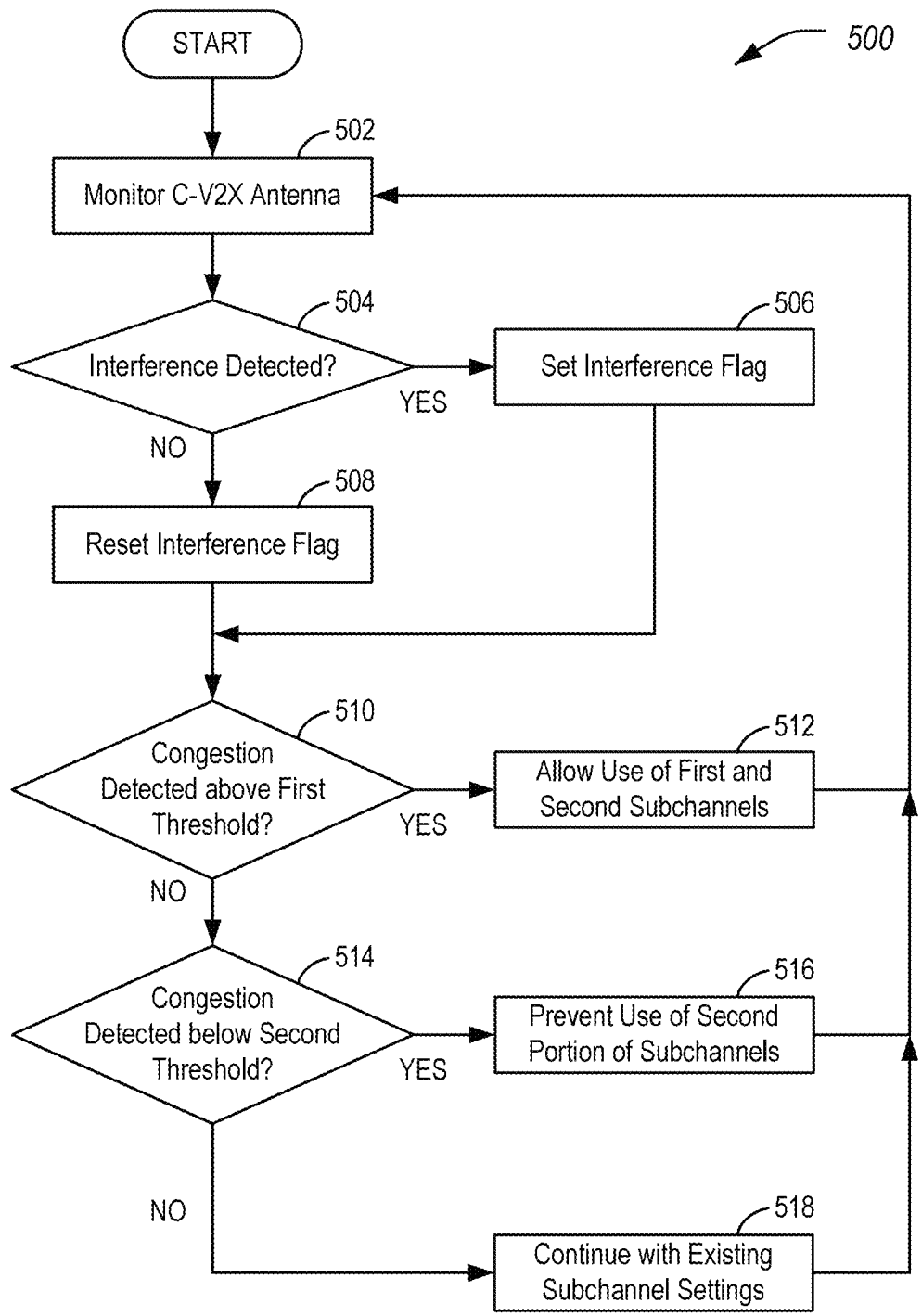
FIG. 5 illustrates an example monitoring portion of a process for adaptive out-of-band interference avoidance.

FIG. 5 illustrates an example monitoring portion of a process 500 for adaptive out-of-band interference 304 avoidance. In an example, the process 500 may be performed by the TCUs 106 of the vehicles 102 in the context of the system 100.

At operation 502, the TCU 106 monitors the C-V2X antenna 110. In an example, the TCU 106 may utilize the C-V2X TX/RX monitor 116 to analyze the signals that are received to the C-V2X antenna 110. For instance, the scheduler 114 may sample the radio channels every sample interval (e.g., every 100 ms). For instance, based on the signal information for the C-V2X antenna 110 that is monitored by the C-V2X TX/RX monitor 116, the TCU 106 may identity whether a valid C-V2X message was picked up by the C-V2X antenna 110. Or, if not, the TCU 106 may identify whether signal is detected above a minimum threshold signal level but that is not decodable into a valid message. Or the TCU 106 may identify that only background noise (e.g, a low level of signal) is detected.

At operation 504, the TCU 106 determines whether interference 304 is detected. In an example, if the TCU 106 detects the presence of signal above the threshold signal level but that is not decodable into a valid message, then the TCU 106 may infer that interference 304 was picked up. If so, control passes to operation 506. Otherwise, control passes to operation 508.

At operation 506, the TCU 106 sets a flag indicative of interference 304. When set, any BSMs 302 sent by the TCU 106 may include an indication that interference 304 was detected by the vehicle 102. After operation 506, control passes to operation 510. This flag may be stored to a storage of the TCU 106, in an example.

At operation 508, the TCU 106 clears the flag indicative of interference 304. When cleared, any BSMs 302 sent by the TCU 106 will not include an indication that interference 304 was detected by the vehicle 102. After operation 508, control passes to operation 510.

At operation 510, the TCU 106 determines whether congestion is detected above a first threshold amount. For instance, the TCU 106 may determine, based on the monitoring performed at operation 502, whether C-V2X congestion exceeds the first threshold of BSMs 302 received per time (e.g., $M_1$=500 BSMs/sec). If so, control passes to operation 512. If not, control passes to operation 514.

At operation 512, the TCU 106 allows the use of all subchannel 402 and 404 for sending BSMs 302. For instance, the TCU 106 may set a mode or other indication in the storage of the TCU 106 to indicate that any BSMs 302 sent by the TCU 106 may use the subchannel 402 and/or the subchannels 404. After operation 512, the process 500 returns to operation 502 to again monitor the C-V2X antenna 110.

At operation 514, the TCU 106 determines whether congestion is detected below a second threshold amount. For instance, the TCU 106 may determine, based on the monitoring performed at operation 502, whether C-V2X congestion is below the second threshold of BSMs 302 received per time (e.g., $M_2$=450 BSMs/sec). If so, control passes to operation 516. If not, control passes to operation 518.

At operation 516, the TCU 106 prevents the use of subchannels 404 but allows use of the subchannels 402 for sending BSMs 302. For instance, the TCU 106 may reset a mode or other indication in the storage of the TCU 106 to indicate that any BSMs 302 sent by the TCU 106 may use the subchannels 402 but not the subchannels 404. After operation 516, the process 500 returns to operation 502 to again monitor the C-V2X antenna 110.

At operation 518, the TCU 106 continues to use the according to the previous settings. For instance, the TCU 106 may neither set nor reset the mode or other indication in the storage of the TCU 106 to preserve the existing mode of operation of the TCU 106. After operation 518, the process 500 returns to operation 502 to again monitor the C-V2X antenna 110.

Figure 6:
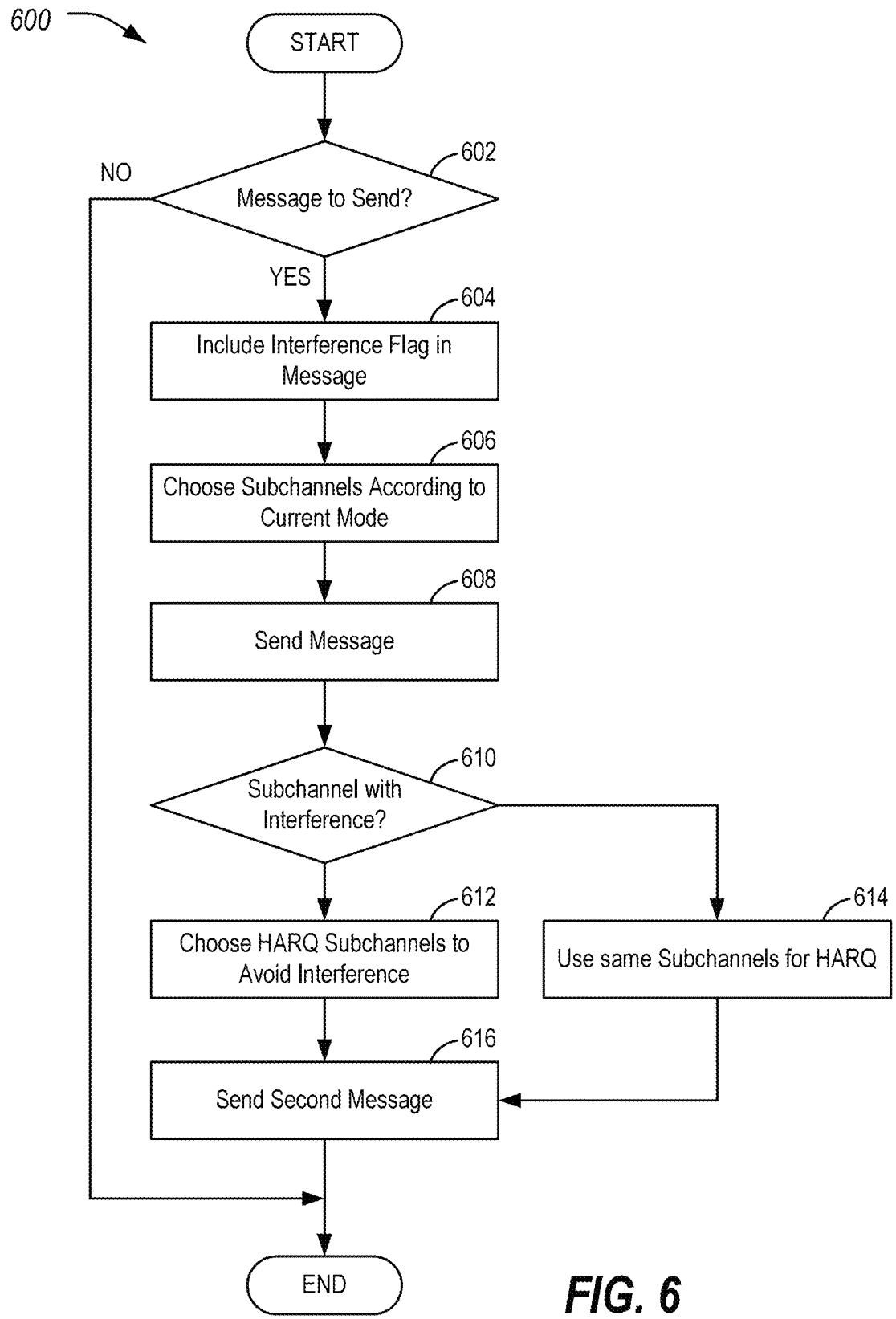
FIG. 6 illustrates an example sending portion of a process for adaptive out-of-band interference avoidance.

FIG. 6 illustrates an example portion of a process 600 for adaptive out-of-band interference 304 avoidance. In an example, as with the process 500 the process 600 may be performed by the TCUs 106 of the vehicles 102 in the context of the system 100.

At operation 602, the TCU 106 determines whether a BSM 302 should be sent. In an example, the TCU 106 may determine that the vehicle 102 is ready to send the next periodic BSM 302.

At operation 604, the TCU 106 includes the interference 304 flag in the BSM 302. In an example, the TCU 106 may retrieve the flag that is set or cleared, as discussed above with respect to operations 506 and 508 of the process 500. This flag may allow a recipient of the BSM 302 to be aware of whether interference 304 was detected by the vehicle 102 sending the BSM 302.

At operation 606, the TCU 106 chooses subchannels 402, 404 on which to send the BSM 302 according to the current mode. In an example, the TCU 106 may choose the subchannels 402, 404 over which to send the BSM 302 based on the mode determined using operations 510-518 of the process 500. This may allow the BSM 302 to be send on the subchannel 402 less likely to experience interference 304 when congestion is low but may also allow for the user of the subchannels 404 more likely to experience interference 304 when congestion is higher.

At operation 608, the TCU 106 sends the BSM 302. Thus, the TCU 106 utilizes the C-V2X antenna 110 to send the BSM 302 including the status of the interference 304 as well as within the subchannels 402, 404 specified by the current level of congestion.

At operation 610, the TCU 106 determines whether the BSM 302 was sent using subchannels 402, 404 encountering the interference 304. In an example, the TCU 106 may have determined, at operation 502 of the process 500, that interference 304 is detected. Moreover, the TCU 106 may also recognize whether the BSM 302 sent at operation 608 was sent using the subchannels 404 more likely to be affected by the interference 304. If these conditions are met, then control passes to operation 612. If not control passes to operation 614.

At operation 612, the TCU 106 chooses subchannels 402, 404 for the HARQ to avoid the interference 304. For instance, the TCU 106 may select subchannels 402 to send the HARQ BSM 302, instead of the subchannels 404 on which the BSM 302 was sent at operation 608. After operation 612, control passes to operation 616.

At operation 614, the TCU 106 uses the same subchannels 402, 404 for sending the HARQ as for sending the BSM 302 at operation 608. After operation 614, control passes to operation 616.

At operation 616, the TCU 106 sends the send BSM 302. Thus, the TCU 106 utilizes the C-V2X antenna 110 to send the BSM 302 including the status of the interference 304 as well as optionally on different subchannels 402 from the sending of the first BSM 302. This shifting of the subchannels 402, 404 may aid in the reception of the information in the BSMs 302 by other vehicles 102 potentially affected by the interference 304. After operation 616, the process 600 ends.

Figure 7:
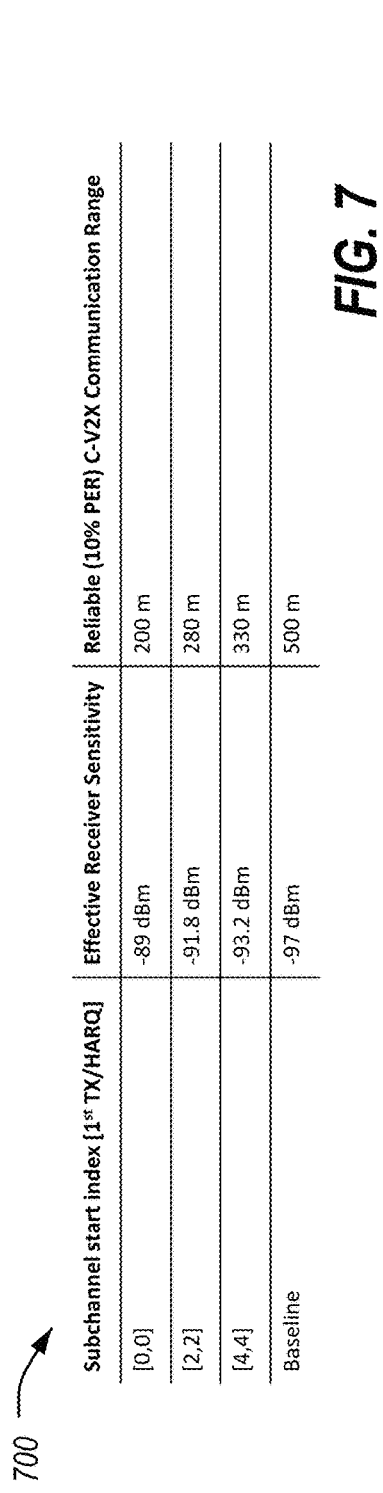
FIG. 7 illustrates an example of modeling of the improvement in reliability of sending of BSMs in accordance with the adaptive out-of-band interference avoidance as described in the processes of FIGS. 5-6.

FIG. 7 illustrates an example 700 modeling of the improvement in reliability of sending of BSMs 302 in accordance with the adaptive out-of-band interference 304 avoidance as described in the processes 500 and 600.

Similar to as discussed above, let each BSM 302 include two transmissions: a first BSM 302 and a HARQ BSM 302 for redundancy to enhance reliable reception. Let the tuple [X, Y] indicate the subchannels 402, 404 on which the first BSM 302 (represented as X) and the HARQ BSM 302 (represented as Y) are sent. Thus, the tuple [0, 0] represents when both the first and the HARQ BSM 302 transmissions occur in the lowest two subchannels 404 starting at index zero (close to 5905 MHz). The tuple [2, 2] represents when both the first and the HARQ BSM 302 transmissions occur two subchannels 402 removed from lowest starting at index two (close to 5908.6 MHz). The tuple [4, 4] represents when both the first and the HARQ BSM 302 transmissions occur four subchannels 402 removed from lowest starting at index four (close to 5919 MHz)

For this example 700, let the OOBE interference 304 be based on Gaussian noise, which may be modeled for sake of illustration with a 16% duty cycle, 90 dB isolation, and with approximately 10.3 dBm emitted power over the ITS band. Additionally, let the free space path loss be 15 dBm EIRP (transmit power), 4 dB blocking loss, 6 dB OBU cable loss, with a −97 dBm receiver sensitivity for 389-byte BSM 302. Let the default number of turbo coding iterations be five, with a modulation/coding scheme based on J3161/1 MCS settings.

The results shown in the example 700 show that by operating in the middle part of the ITS band, OOBE interference 304 from U-NII-4 is largely avoided and C-V2X reliable communication range may be increased.

Figure 8:
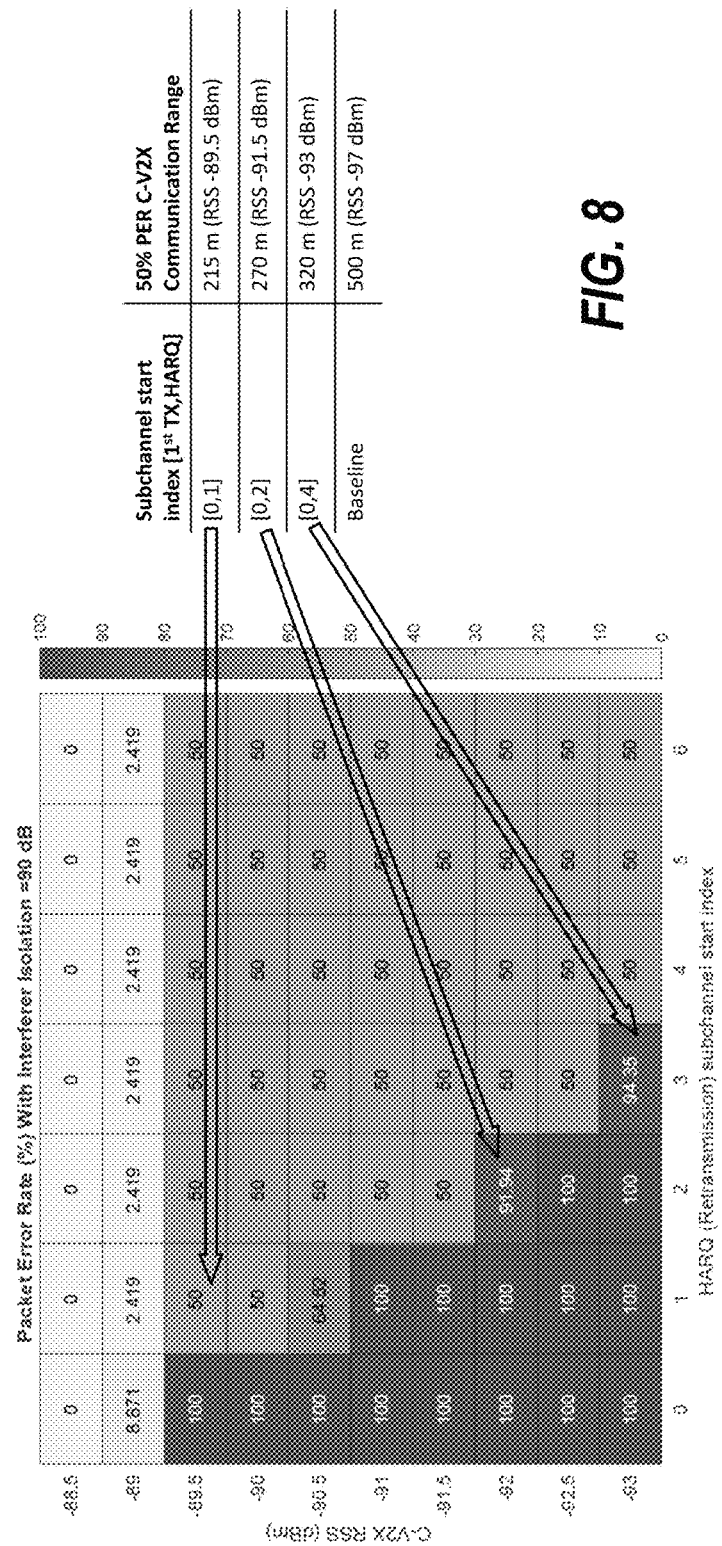
FIG. 8 illustrates an example of further modeling of the improvement in reliability of sending of BSMs in accordance with the adaptive out-of-band interference avoidance as described in the processes of FIGS. 5-6.

FIG. 8 illustrates an example 800 of further modeling of the improvement in reliability of sending of BSMs 302 in accordance with the adaptive out-of-band interference 304 avoidance as described in the processes 500 and 600.

Suppose again that each BSM 302 include two transmissions: a first BSM 302 and a HARQ BSM 302 for redundancy to enhance reliable reception. However, as opposed to the example 700 in which both BSM 302 transmission are made in the same two subchannels 402, 404, in the example 800, different subchannels may be used for either transmission.

Let the tuple [0, X] represent where the first BSM 302 transmission occur in the lowest two ITS subchannels (5905-5908.6 MHz) and the second BSM 302 HARQ transmission is made on a different subchannels with starting index X.

As shown in the example 800, even if one of the transmissions (such as HARQ) is made for every BSM 302 at higher subchannel index X (e.g., further away from band edge of OOBE U-NII-4) that this further aids in reduction of Packet Error Rate (PER).

Utilizing this aspect, if the vehicle 102 must use most vulnerable subchannels 404 in either the first transmission of the BSM 302 or the HARQ BSM 302 transmission (e.g., in the illustrated examples with indices below N<=2), the vehicle 102 may can ensure that the HARQ alternative transmission occurs in subchannels at least N subchannels removed. For example, if the first BSM 302 transmission starts at subchannel index 0, then the HARQ retransmission may start in subchannel index 2 (or greater). This may lead to increases in the 50% PER C-V2X communication range from 215 meters to 270 meters. Continuing with the example 800, if an even higher subchannel index (e.g., X=4) for HARQ is used, then the range may go up to even 320 meters.

Thus, the system 100 provides enhanced interference management instead of merely detecting it. This provides for am more reliable communication range for C-V2X messaging. The system 100 may be implanted using the aforementioned changes in the 3GPP semipersistent/one-shot scheduling that is currently used in SAE J3161/1. Additionally, the system 100 is opportunistic and balances both OOBE interference 304 avoidance and C-V2X channel congestion.

Variations on the disclosed approaches are possible. In an example, the disclosed concepts may be extended to OOBE interference appearing from U-NII-5 band (above 5925 MHz) at the other edge rather than from U-NII-4. In such a case, the subchannel index adaptations may be reversed where the highest subchannels are deemed relatively more vulnerable to interference 304.

Figure 9:
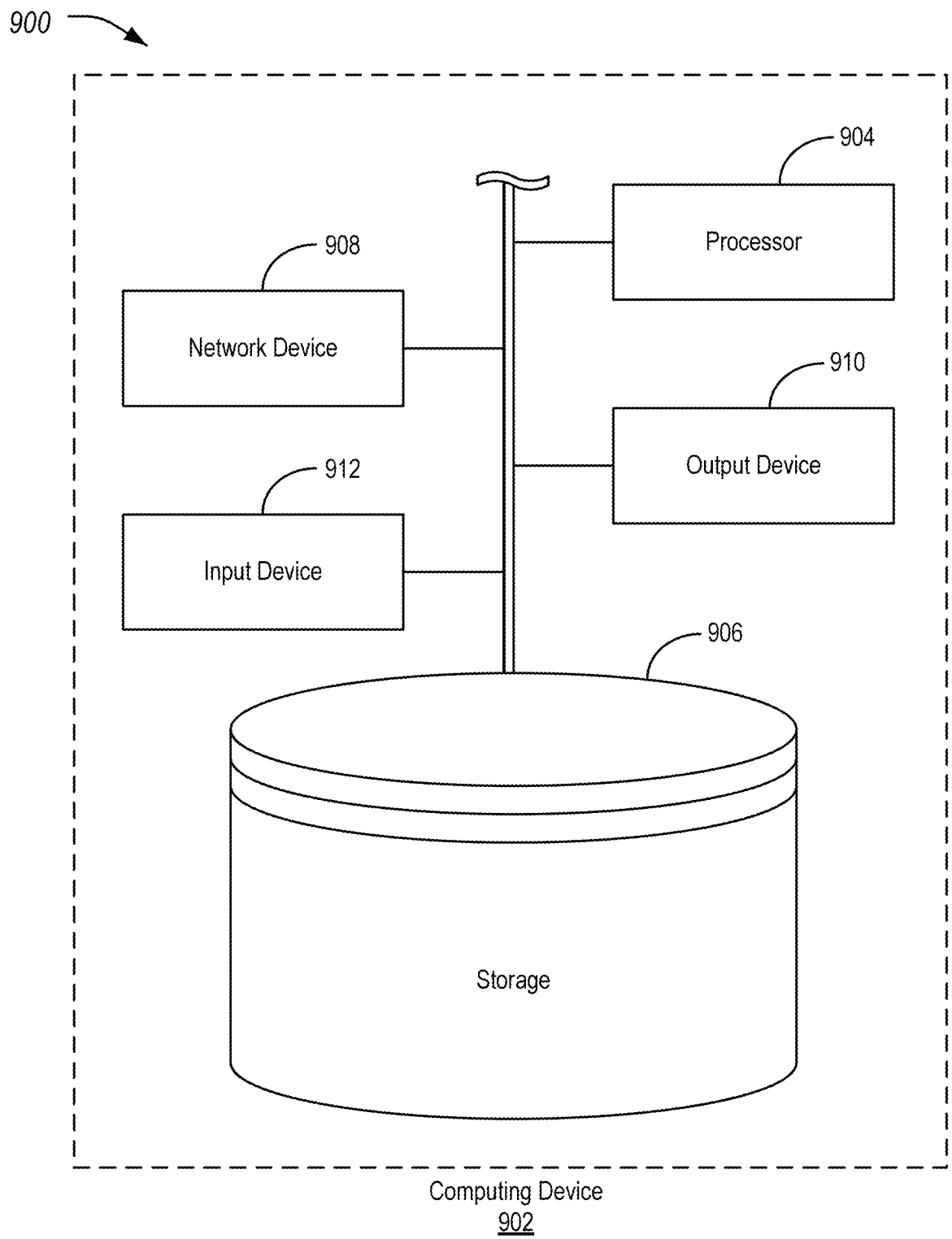
FIG. 9 illustrates an example computing device for tracking a non-reputable vehicle change history.

FIG. 9 illustrates an example computing device 902 for scheduling vehicle communications using a plurality of wireless interfaces. Referring to FIG. 9, and with reference to FIGS. 1-8, the ECUs 104 and TCU 106 may include examples of such computing devices 902. Computing devices 902 generally include computer-executable instructions, such as those of the scheduler 114, where the instructions may be executable by one or more computing devices 902. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the interference 304 flag and mode settings, may be stored and transmitted using a variety of computer-readable media.

As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices 912 that receive human interface inputs may include keyboards, mice, trackballs, touchscreens, microphones, graphics tablets, and the like.

The network devices 908 may each include any of various devices that enable the described components to send and/or receive data from external devices over networks. Examples of suitable network devices 908 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for scheduling communications using a plurality of wireless interfaces, comprising:
   an antenna configured to send and/or receive data over a message protocol having a plurality of subchannels, the plurality of subchannels including first subchannels relatively less susceptible to out-of-band interference and second subchannels relatively more susceptible to the out-of-band interference; and
   a controller configured to utilize a scheduler to perform operations including to
   monitor signals received from the antenna to detect a level of congestion over the message protocol,
   responsive to the level of congestion exceeding a first threshold, transition a transmission mode of the controller to a first mode which allows use of the first and second subchannels for sending messages,
   responsive to the level of congestion being below a second threshold, the second threshold being indicative of a lower level of congestion caused by message protocol traffic over the plurality of subchannels than the first threshold, transition the transmission mode of the controller to a second mode which allows use of the first subchannels but not the second subchannels for sending the messages,
   choose one or more subchannels over which to send a first message of the messages in accordance with the transmission mode, and
   send the first message using the controller.

2. The system of claim 1, wherein the controller is further configured to, responsive to the level of congestion being between the first threshold and the second threshold, maintain the transmission mode at the current transmission mode.

3. The system of claim 1, wherein the controller is further configured to:
   monitor the signals received from the antenna to detect a level of interference,
   responsive to the level of interference exceeding a threshold amount, include an interference flag in the messages, the flag indicating presence of interference to recipients of the messages; and
   responsive to the level of interference not exceeding the threshold amount, refrain from including the interference flag in the messages.

4. The system of claim 3, wherein the controller is further configured to:
   send a second message of the messages, using the controller, using the one or more subchannels used to send the first message.

5. The system of claim 3, wherein the controller is further configured to:
   responsive to the one or more subchannels being chosen from the second subchannels, choose a different one or more channels to send a second message of the messages, the different one or more channels being selected from the first subchannels; and
   send the second message of the messages, using the controller, using the different one or more subchannels.

6. The system of claim 1, wherein the message protocol is a cellular vehicle-to-everything (C-V2X) messaging protocol, and the out-of-band interference results from use of Wi-Fi.

7. A method for scheduling communications using a plurality of wireless interfaces, comprising:
   monitoring signals received from an antenna to detect a level of congestion over a message protocol, the antenna being configured to send and/or receive data over a message protocol having a plurality of subchannels, the plurality of subchannels including first subchannels relatively less susceptible to out-of-band interference and second subchannels relatively more susceptible to the out-of-band interference;

responsive to the level of congestion exceeding a first threshold, transitioning a transmission mode to a first mode which allows use of the first and second subchannels for sending messages;

responsive to the level of congestion being below a second threshold, the second threshold being indicative of a lower level of congestion caused by message protocol traffic over the subchannels than the first threshold, transitioning the transmission mode to a second mode which allows use of the first subchannels but not the second subchannels for sending the messages;

choosing one or more subchannels over which to send a first message of the messages in accordance with the transmission mode; and sending the first message using the antenna.

8. The method of claim 7, further comprising, responsive to the level of congestion being between the first threshold and the second threshold, maintaining the transmission mode at the current transmission mode.

9. The method of claim 7, further comprising:

monitoring the signals received from the antenna to detect a level of interference, responsive to the level of interference exceeding a threshold amount, including an interference flag in the messages, the flag indicating presence of interference to recipients of the messages; and responsive to the level of interference not exceeding the threshold amount, refraining from including the interference flag in the messages.

10. The method of claim 9, further comprising sending a second message of the messages using the one or more subchannels used to send the first message.

11. The method of claim 9, further comprising:

responsive to the one or more subchannels being chosen from the second subchannels, choosing a different one or more channels to send a second message of the messages, the different one or more channels being selected from the first subchannels; and sending the second message of the messages using the different one or more subchannels.

12. The method of claim 9, wherein the message protocol is a cellular vehicle-to-everything (C-V2X) messaging protocol, and the interference results from use of Wi-Fi.

13. A non-transitory computer-readable medium comprising instructions for scheduling communications using a plurality of wireless interfaces that, when executed by a processor of a controller, cause the controller to perform operations including to:

monitor signals received from an antenna to detect a level of congestion over a message protocol, the antenna being configured to send and/or receive data over a message protocol having a plurality of subchannels, the plurality of subchannels including first subchannels relatively less susceptible to out-of-band interference and second subchannels relatively more susceptible to the out-of-band interference;

responsive to the level of congestion exceeding a first threshold, transition a transmission mode to a first mode which allows use of the first and second subchannels for sending messages;

responsive to the level of congestion being below a second threshold, the second threshold being indicative of a lower level of congestion caused by message protocol traffic over the subchannels than the first threshold, transition the transmission mode to a second mode which allows use of the first subchannels but not the second subchannels for sending the messages;

choose one or more subchannels over which to send a first message of the messages in accordance with the transmission mode; and send the first message using the antenna.

14. The medium of claim 13, further comprising instructions, that, when executed by the processor of the controller, cause the controller to perform operations including to, responsive to the level of congestion being between the first threshold and the second threshold, maintain the transmission mode at the current transmission mode.

15. The medium of claim 13, further comprising instructions, that, when executed by the processor of the controller, cause the controller to perform operations including to:

monitor the signals received from the antenna to detect a level of interference, responsive to the level of interference exceeding a threshold amount, include an interference flag in the messages, the flag indicating presence of interference to recipients of the messages; and responsive to the level of interference not exceeding the threshold amount, refrain from including the interference flag in the messages.

16. The medium of claim 15, further comprising instructions, that, when executed by the processor of the controller, cause the controller to perform operations including to, send a second message of the messages using the one or more subchannels used to send the first message.

17. The medium of claim 15, further comprising instructions, that, when executed by the processor of the controller, cause the controller to perform operations including to:

responsive to the one or more subchannels being chosen from the second subchannels, choose a different one or more channels to send a second message of the messages, the different one or more channels being selected from the first subchannels; and send the second message of the messages using the different one or more subchannels.

18. The medium of claim 15, wherein the message protocol is a cellular vehicle-to-everything (C-V2X) messaging protocol, and the interference results from use of Wi-Fi.

* * * * *